United States Patent
Sano et al.

(10) Patent No.: US 8,811,486 B2
(45) Date of Patent: Aug. 19, 2014

(54) VIDEO ENCODING METHOD, VIDEO ENCODING APPARATUS, VIDEO ENCODING PROGRAM AND STORAGE MEDIUM OF THE SAME

(75) Inventors: Takashi Sano, Yokosuka (JP); Hiroe Iwasaki, Yokosuka (JP); Jiro Naganuma, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 896 days.

(21) Appl. No.: 12/936,626

(22) PCT Filed: Apr. 8, 2008

(86) PCT No.: PCT/JP2008/056944
§ 371 (c)(1),
(2), (4) Date: Dec. 20, 2010

(87) PCT Pub. No.: WO2009/125475
PCT Pub. Date: Oct. 15, 2009

(65) Prior Publication Data
US 2011/0096840 A1    Apr. 28, 2011

(51) Int. Cl.
*H04N 7/12*    (2006.01)
*H04N 11/02*    (2006.01)
*H04N 11/04*    (2006.01)
*G06K 9/46*    (2006.01)

(52) U.S. Cl.
USPC ............ 375/240.16; 375/240.03; 375/240.12; 375/240.25; 382/239

(58) Field of Classification Search
None
See application file for complete search history.

(56) References Cited

U.S. PATENT DOCUMENTS

| 5,721,588 A | 2/1998 | Fujiwara et al. |
| 5,760,835 A | 6/1998 | Fujiwara et al. |

(Continued)

FOREIGN PATENT DOCUMENTS

| JP | 8-46971 A | 2/1996 |
| JP | 9-102910 A | 4/1997 |

(Continued)

OTHER PUBLICATIONS

Lejun Yu, Jintao Li, Yongdong Zhang, "Fast picture and macroblock level adaptive frame/field coding for h.264", 2006, IEEE, pp. 768-771.*

(Continued)

*Primary Examiner* — Joseph Ustaris
*Assistant Examiner* — Ellyar Y Barazesh
(74) *Attorney, Agent, or Firm* — Harness, Dickey & Pierce, P.L.C.

(57) ABSTRACT

A motion detection portion of a video encoding apparatus conducts motion detection on each of frame macroblocks and field macroblocks to calculate motion vectors and respective detection cost. A motion vector evaluation value calculation portion calculates an evaluation value of the size of motion vectors. A motion vector threshold determination portion compares the evaluation value of the size of motion vectors to a predetermined threshold to determine whether the target area is a moving area or a still area. If the target area is a moving area, it is determined whether frame or field macroblock mode is to be used by comparing the detection costs. If the target area is a still area, it is determined whether frame or field macroblock mode is to be used in accordance with the size of the sum of absolute values of differences between neighboring pixels in a vertical direction regarding the frame macroblock and field macroblock.

11 Claims, 8 Drawing Sheets

(56) References Cited

U.S. PATENT DOCUMENTS

| | | | |
|---|---|---|---|
| 7,551,673 B1* | 6/2009 | Oh et al. | 375/240.16 |
| 2005/0013365 A1* | 1/2005 | Mukerjee et al. | 375/240.16 |
| 2005/0259734 A1* | 11/2005 | Hellman | 375/240.16 |
| 2006/0056708 A1* | 3/2006 | Shen et al. | 382/232 |
| 2006/0126741 A1 | 6/2006 | Saito et al. | |
| 2006/0222251 A1* | 10/2006 | Zhang | 382/239 |

FOREIGN PATENT DOCUMENTS

| | | |
|---|---|---|
| JP | 11-298904 | 10/1999 |
| JP | 2006-74499 A | 3/2006 |
| JP | 2006-165840 A | 6/2006 |
| JP | 2007-27805 A | 2/2007 |
| JP | 2008-98796 A | 4/2008 |
| WO | 2007/129433 A1 | 11/2007 |

OTHER PUBLICATIONS

Xi Min Zhang, Anthony Vetro, Huifang Sun, Yun Q. Shi, "Adaptive field/frame selectrion for high compression coding", Jan. 2003, SPIE conference on Image and Video Communications and Processing.*

Yu, Lejun, et al., "Fast Picture and Macroblock Level Adaptive Frame/Field Coding for H.264," IEEE Asia-Pacific Conference on Circuits and Systems, Dec. 4, 2006, pp. 768-771.

* cited by examiner

VIDEO ENCODING METHOD, VIDEO ENCODING APPARATUS, VIDEO ENCODING PROGRAM AND STORAGE MEDIUM OF THE SAME

TECHNICAL FIELD

The present invention relates to a video encoding method which compresses video data by dividing the video data including frames constituted from a pair of fields into macroblocks of a predetermined size and which outputs a bit stream.

BACKGROUND ART

In the prior art, when the video data which includes each frame constituted from a pair of fields is encoded, a mode is determined after encoding by using both a frame macroblock mode and field macroblock mode and comparing numbers of generated bits therebetween. Further, as described in "VIDEO ENCODING METHOD, VIDEO ENCODING APPARATUS AND STORAGE MEDIUM STORING VIDEO ENCODING PROGRAM" of patent document 1, a method is proposed in which encoding steps are duplicated, and the mode is determined based on a result of the first step.

In encoding methods of the prior arts, there are following problems when determining a frame/field macroblock mode.

A generally used video encoding apparatus conducts encoding operation using the frame macroblock mode and the field macroblock mode and selects a comparatively efficient mode. In such a case, it is necessary to conduct encoding operations multiple times, and for example, if software is used for implementing such operations, a CPU load is increased, and it takes a long time to operate. On the other hand, if implementation of such operations is attempted by using hardware, implementation is difficult because both an area of a chip and power consumption are increased.

The present invention has an object to resolve a problem described above. To resolve such a problem, in the present invention, when encoding the video data including rectangle areas, it is possible to adaptively select the frame macroblock mode and the field macro block mode based on the input images and/or predicted motion. Therefore, the present invention can reduce the amount of calculation or the size of hardware without deteriorating the encoding efficiency.

[Patent Document 1] Japanese Patent Application, First Publication No. H11-298904

DISCLOSURE OF INVENTION

To solve the above-described problem, the present invention has, for example, the following aspects.

A first aspect, in a video encoding method which compresses video data by dividing the video data including frames constituted from a pair of fields into macroblocks of a predetermined size and which outputs a bit stream, uses the following method:

(a) A first means divides a rectangle including M pixels along a horizontal direction and 2M pixels along a vertical direction into a pair of rectangles including M pixels along a horizontal direction and M pixels along a vertical direction, conducts a motion detection regarding each of a pair of rectangles and calculates both encoding costs (hereinafter, frame detection costs) and motion vectors;

(b) A second means divides a rectangle including M pixels along a horizontal direction and 2M pixels along a vertical direction into a rectangle including M pixels along a horizontal direction and M pixels constituted from odd lines along a vertical direction and a rectangle including M pixels along a horizontal direction and M pixels constituted from even lines along a vertical direction, conducts a motion detection regarding each of a pair of rectangles and calculates both encoding costs (hereinafter, field detection costs) and motion vectors;

(c) A third means calculates an evaluation value of size of motion vectors determined as a result of motion detection of both the first step and the second means;

(d) A fourth means compares the frame detection cost calculated by the first means to the frame detection cost calculated by the second means and chooses a comparatively small cost if the evaluation value of the size of the motion vectors calculated by the third means is larger than a predetermined threshold;

(e) A fifth means conducts encoding on the encoding target area as a frame macroblock mode if the frame detection cost is chosen by the fourth means;

(f) A sixth means conducts encoding on the encoding target area as a field macroblock mode if the field detection cost is chosen by the fourth means;

(g) A seventh means calculates sum of absolute values of differences between neighboring pixels in a vertical direction regarding the frame macro blocks and field macro blocks and chooses a comparatively small one if the evaluation value of size of the motion vector calculated by the third means is smaller than the predetermined threshold;

(h) An eighth means conducts encoding on the encoding target area as a frame macroblock mode if the frame pixel cost is chosen by the seventh means; and (i) A ninth means conducts encoding on the encoding target area as a field macroblock mode if the field pixel cost is chosen by the seventh means.

As an evaluation value of size of motion vectors, it is possible to use the maximum, minimum or average value of absolute values of horizontal and vertical components of motion vectors that are calculated regarding each of the frame macroblocks, field macroblocks or divided blocks of these macroblocks.

Further, as an evaluation value of the size of motion vectors, it is possible to use the maximum, minimum or average value of the Manhattan distance of motion vectors that are calculated regarding each of the frame macroblocks, field macroblocks or divided blocks of these macroblocks Further, as an evaluation value of size of motion vectors, it is possible to use the maximum, minimum or average value of length of motion vectors that are calculated regarding each of the frame macroblocks, field macroblocks or divided blocks of these macroblocks In the above-described aspects, by applying the above-described methods, it is possible to select the frame macroblock mode/field macroblock mode and to reduce the amount of calculation and traffic to memory.

Further, the above-described aspects are video encoding methods which compresses video data by dividing the video data including frames constituted from a pair of fields into macroblocks of a predetermined size and which outputs a bit stream, include a means for determining whether encoding by using the frame macroblock mode or field macroblock mode based on both the results of motion detection and the input image information, conduct an encoding operation by using the frame macroblock mode or field macroblock mode based on the determination result and hence, and achieve benefits as described below.

If software is used for implementing the above-described video encoding method, a CPU load is reduced, and the operation time is shortened.

If hardware is used for implementing the above-described video encoding method, it is possible to implement by a comparatively small area of a chip and by consuming comparatively small amount of power.

DESCRIPTION OF THE REFERENCE SYMBOLS

Figure 1:
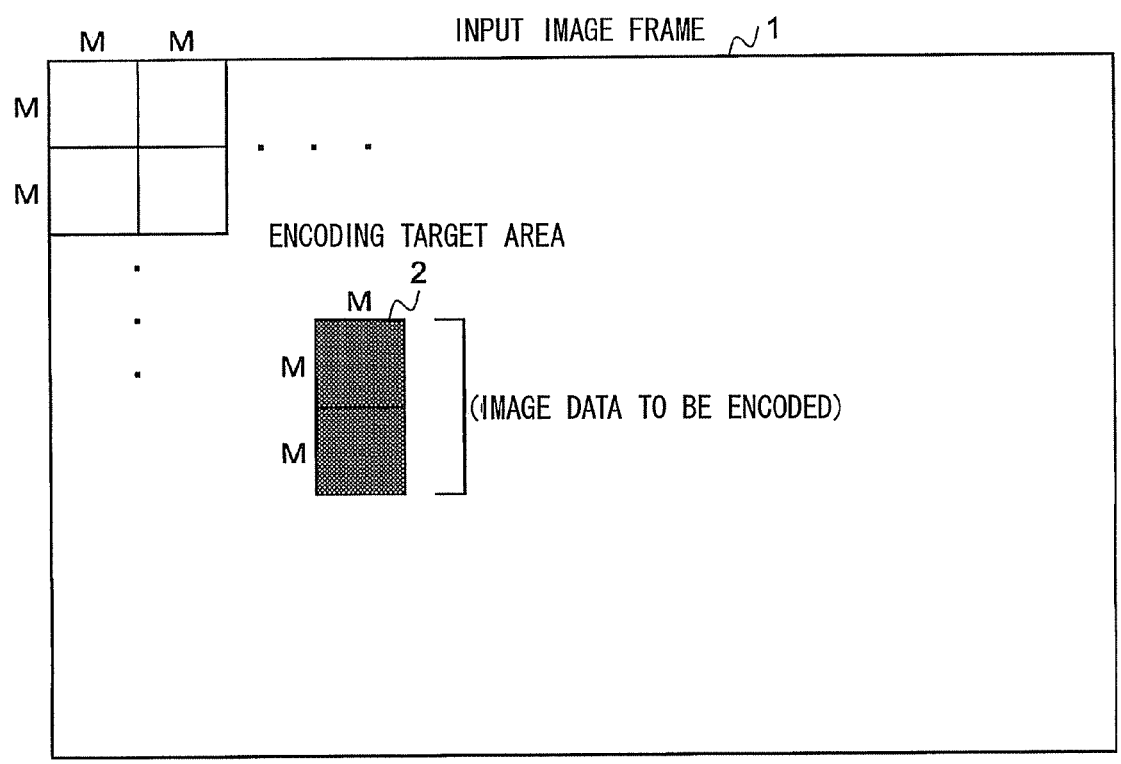
FIG. 1 is an explanation drawing showing an encoding target area of one embodiment.

1 Input image frame
2 Encoding target area
3 Frame macroblock
4 Field macroblock
101 Motion detection portion
102 Motion vector evaluation value calculation portion
103 Motion vector threshold determination portion
104 Mcost frame/field determination portion
105 Sum of absolute values of differences between neighboring pixels calculation portion
106 Pcost frame/field determination portion
107 Frame macroblock encoding portion
108 Field macroblock encoding portion

BEST MODE FOR CARRYING OUT THE INVENTION

Hereinafter, in reference to the drawings, preferable embodiments of the present invention are explained. However, the present invention is not limited by each of the following embodiments, and for example, it is possible to appropriately combine constitutional elements of the following embodiments.

Further, in the following embodiments, a case is explained as an example in which a size of a macroblock is M pixels (M=16).

FIG. 1 shows an example of an encoding target block which is divided from one frame of an embodiment explained below. "1" shown in the drawings is an input image frame. Encoding target image data (hereinafter, encoding target area) 2 is generated by dividing a portion of the input image frame 1 so as to be a rectangular of M×2M as shown in FIG. 1.

Figure 2:
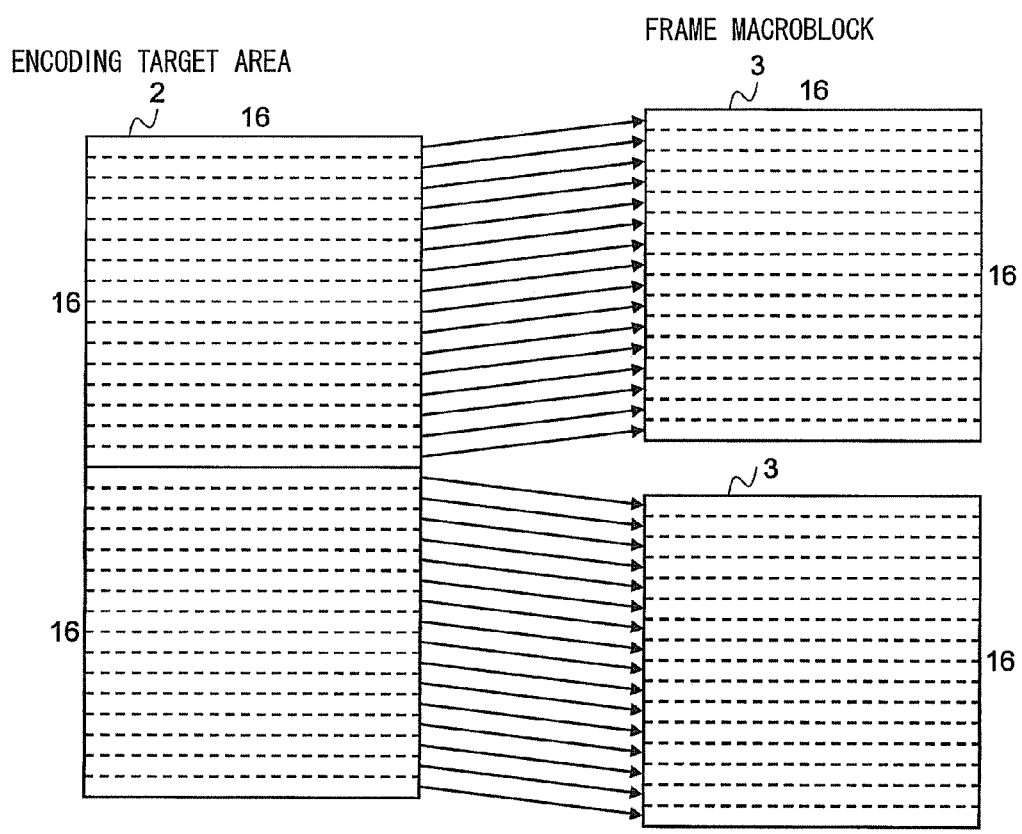
FIG. 2 is an explanation drawing showing a frame macroblock used in one embodiment.

FIG. 2 is an explanation drawing showing a frame macroblock used in this embodiment. Each of two blocks of M×M shown in FIG. 2 and arranged in a vertical direction that is generated by dividing the encoding target area of M×2M (M=16) is called a framemacro block. A reference numeral 3 of FIG. 2 shows the frame macroblock.

Figure 3:
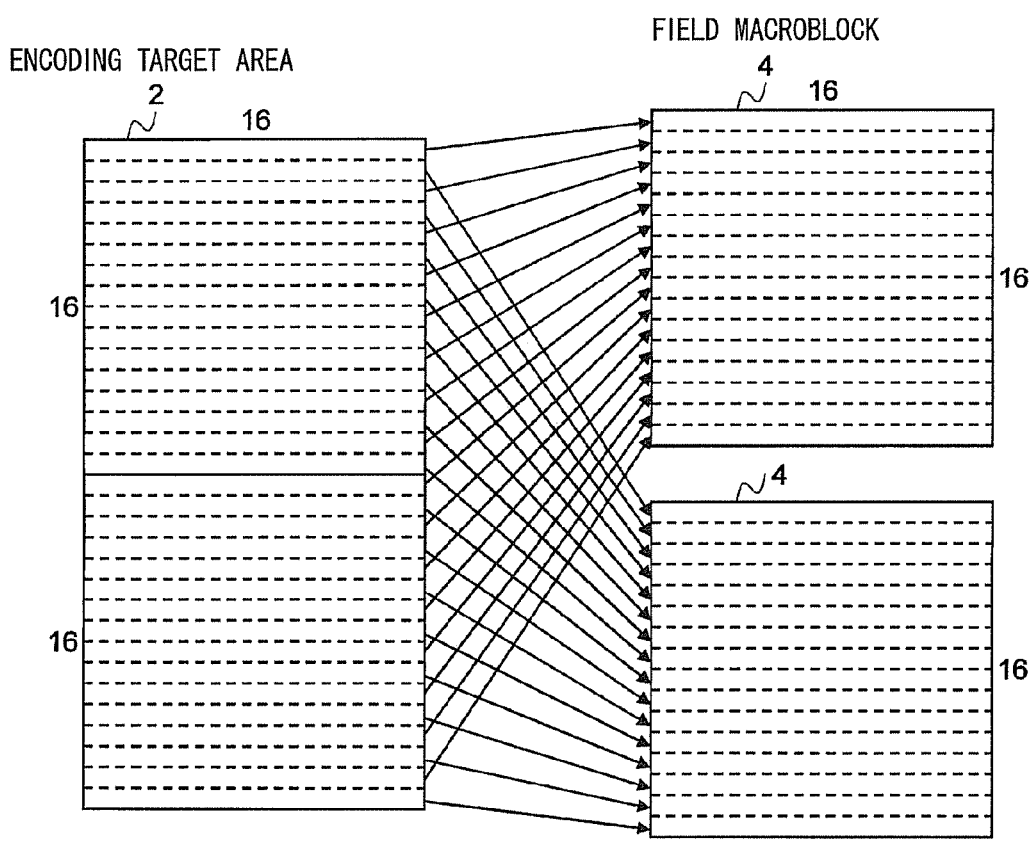
FIG. 3 is an explanation drawing showing a field macroblock used in one embodiment.

FIG. 3 is an explanation drawing showing a field macroblock used in this embodiment. As shown in FIG. 3, a block of M×M generated from odd lines of the encoding target area 2 and a block of M×M generated from even lines of the encoding target area 2 that are divided from an encoding target block of the encoding target area 2 of M×2M (M=16) are called field macroblocks. A reference numeral 4 of the drawings shows the field macroblock.

Figure 4:
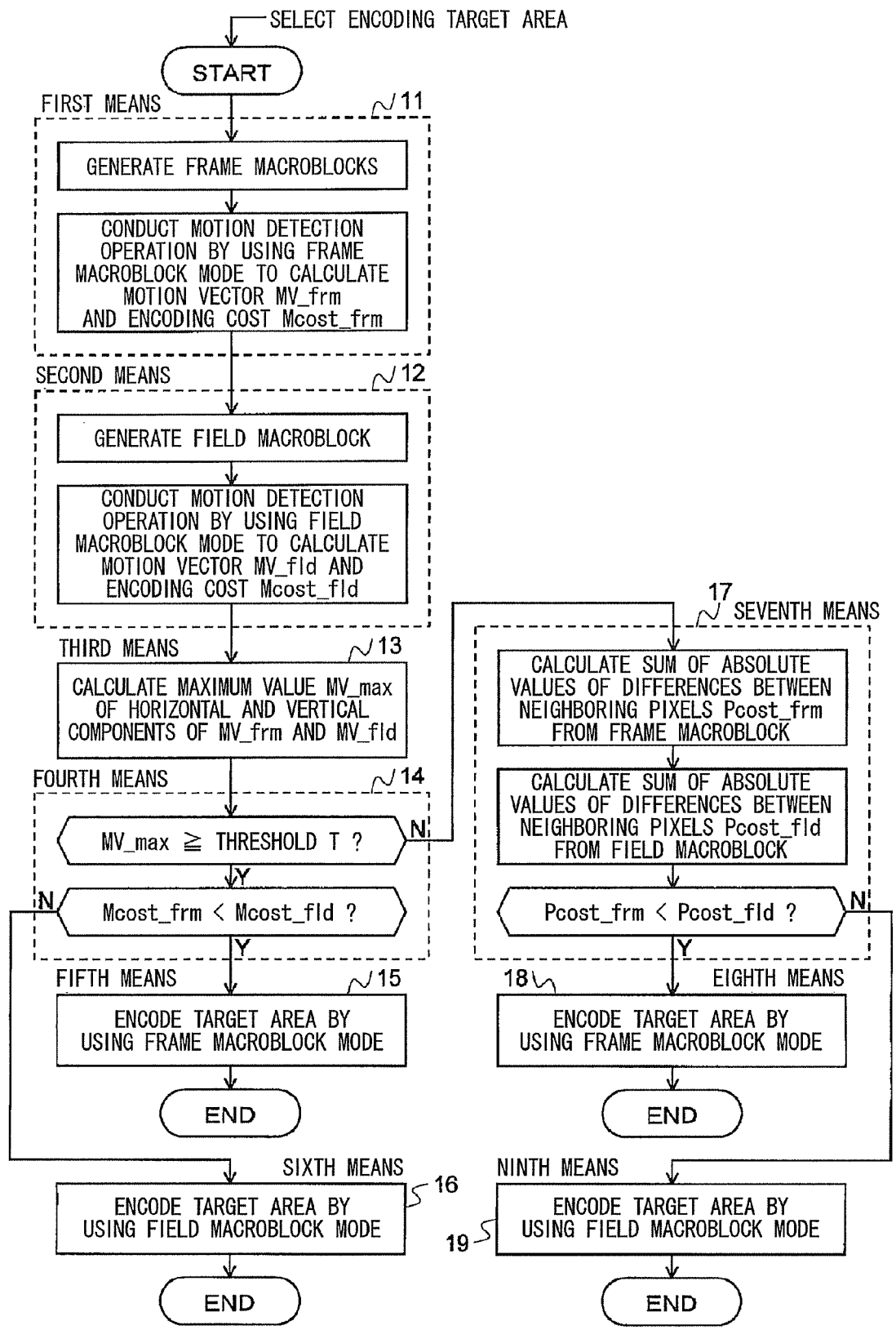
FIG. 4 is a flowchart showing an operation of a first embodiment.

FIG. 4 is a flowchart of a video encoding method of a first embodiment using a frame macroblock mode/field macroblock mode determination method.

"11" of the drawings shows a first means (unit) which conducts a motion detection operation on frame macroblocks extracted from the input image which is an encoding target, and by conducting such calculation, a motion vector which is MV_frm and an encoding cost which is Mcost_frm are calculated.

"12" of the drawings shows a second means which conducts a motion detection operation on field macroblocks extracted from the input image which is an encoding target, a motion vector is MV_fld, and an encoding cost is Mcost_fld. The motion detection operations conducted here detect outline of motions included in the image, and a rough detection is acceptable, for example, integer pixel accuracy.

"13" of the drawings is a third means that calculates the maximum value (hereinafter, MV_max) of absolute values between horizontal and vertical components of all or a part of motion vectors calculated by the first means 11 and second means 12. It should be noted that it is acceptable to use the minimum value or average value in place of the maximum value as an evaluation value of the size of motion vectors.

"14" of the drawings shows a fourth means which compares the MV_max calculated by the third means 13 to a threshold T. The threshold T is a parameter used for determining whether the target area is a still area or a moving area and is set in accordance with an indication of 1 pixel per 1/30 second. However, such a setting of the threshold is one simple indication, and it is possible to adjust it if necessary. When MV_max is larger than the threshold T, it is determined that the target area is a moving area, the encoding costs Mcost_frm and Mcost_fld that are calculated by the first means 11 and second means 12 are compared, and a macroblock mode is determined which requires comparatively small cost.

"15" of the drawings shows a fifth means which encodes the target area by using the frame macroblock mode if the fourth means 14 determines that Mcost_frm is comparatively small. "16" of the drawings shows a sixth means which encodes the target area by using the field macroblock mode if the fourth means 14 determines that Mcost_fld is comparatively small.

"17" of the drawings shows a seventh means which, if the fourth means 14 determines that MV_max is not larger than the threshold T, that is, if it is determined that the target area is a still area, regarding the frame macroblock and the field macroblock, calculates the sum of absolute values of differences between neighboring pixels in a vertical direction (hereinafter, respectively called Pcost_frm and Pcost_fld) and compares them.

"18" of the drawings shows an eighth means which encodes the target area by using the frame macroblock mode if the seventh means 17 determines that Pcost_frm is comparatively small. "19" of the drawings shows a ninth means which encodes the target area by using the field macroblock mode if the seventh means 17 determines that Pcost_fld is comparatively small.

Figure 5:
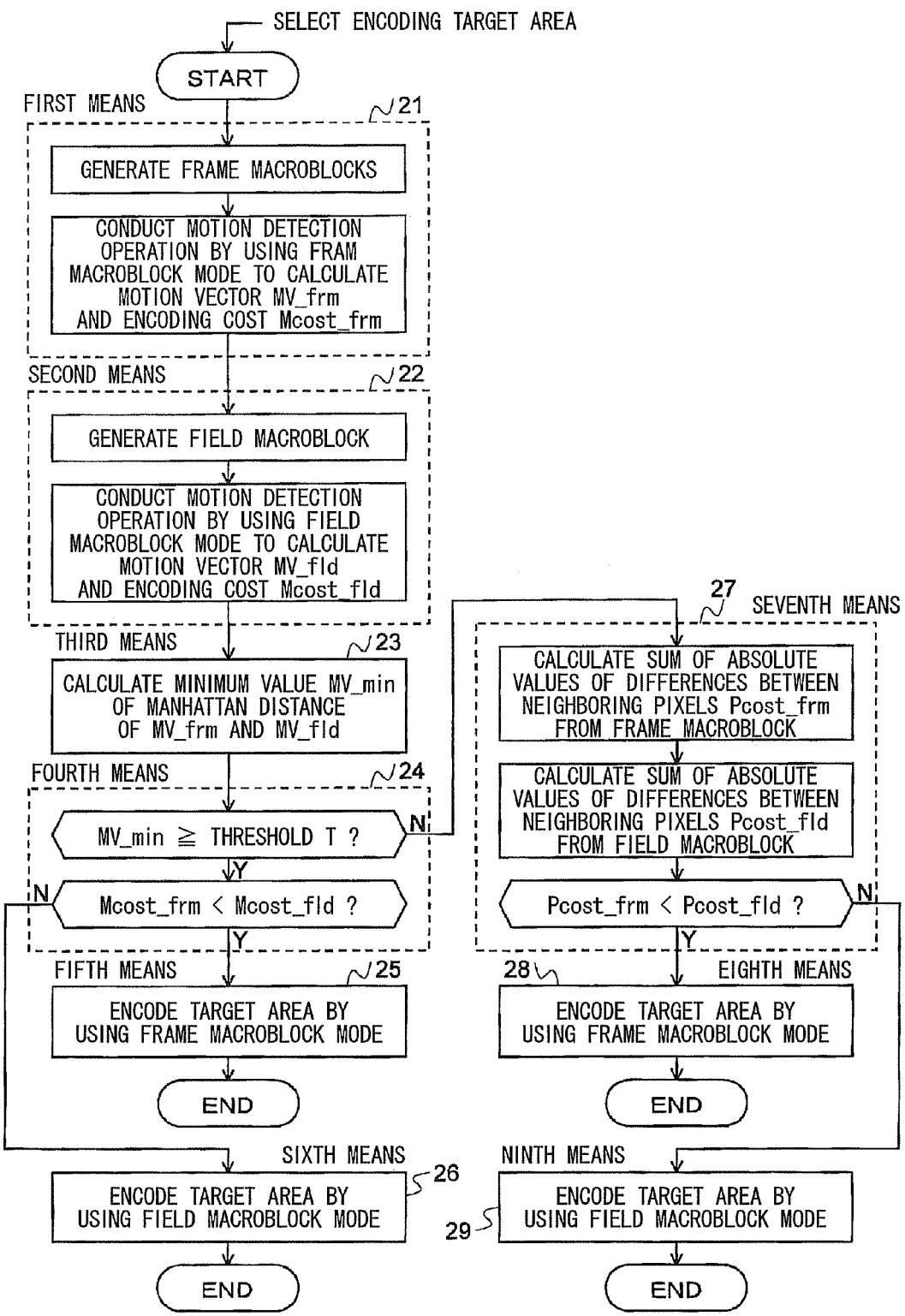
FIG. 5 is a flowchart showing an operation of a second embodiment.

FIG. 5 is a flowchart of a video encoding method using a frame macroblock mode/field macroblock mode determination method of a second embodiment.

"21" of the drawings shows a first means which conducts a motion detection operation on frame macroblocks extracted from the input image which is an encoding target, and by conducting such calculation, a motion vector which is MV_frm and an encoding cost which is Mcost_frm are calculated. "22" of the drawings shows a second means which conducts a motion detection operation on field macroblocks extracted from the input image which is an encoding target, and by conducting such calculation, a motion vector which is MV_fld and an encoding cost which is Mcost_fld are calculated. The motion detection operations conducted here detect outline of motions included in the image, and a rough detection is acceptable, for example, integer pixel accuracy.

"23" of the drawings is a third means that calculates the minimum value (hereinafter, MV_min) of Manhattan distance of all or a part of motion vectors calculated by the first means 21 and second means 22. It should be noted that it is acceptable to use the maximum the value or average value in place to the minimum value as an evaluation value of a size of motion vectors.

"24" of the drawings shows a fourth means which compares the MV_min calculated by the third means 23 to a threshold T. The threshold T is a parameter used for determining whether the target area is a still area or a moving area and is set in accordance with an indication of 1 pixel per 1/30 second. However, such a setting of the threshold is one simple indication, and it is possible to adjust it if necessary. When MV_min is larger than the threshold T, it is determined that the target area is a moving area, the encoding costs Mcost_frm and Mcost_fld that are calculated by the first means 21 and second means 22 are compared, and a macroblock mode of comparatively small cost is determined.

"25" of the drawings shows a fifth means which encodes the target area by using the frame macroblock mode if the fourth means 24 determines that Mcost_frm is comparatively small. "26" of the drawings shows a sixth means which encodes the target area by using the field macroblock mode if the fourth means 24 determines that Mcost_fld is comparatively small.

"27" of the drawings shows a seventh means which, if the fourth means 24 determines that MV_min is not larger than the threshold T, that is, if it is determined that the target area is a still area, regarding the frame macroblock and the field macroblock, calculates the sum of absolute values of differences between neighboring pixels in a vertical direction (hereinafter, respectively called Pcost_frm and Pcost_fld) and compares them.

"28" of the drawings shows an eighth means which encodes the target area by using the frame macroblock mode if the seventh means 27 determines that Pcost_frm is comparatively small. "29" of the drawings shows a ninth means which encodes the target area by using the field macroblock mode if the seventh means 27 determines that Pcost_fld is comparatively small.

Figure 6:
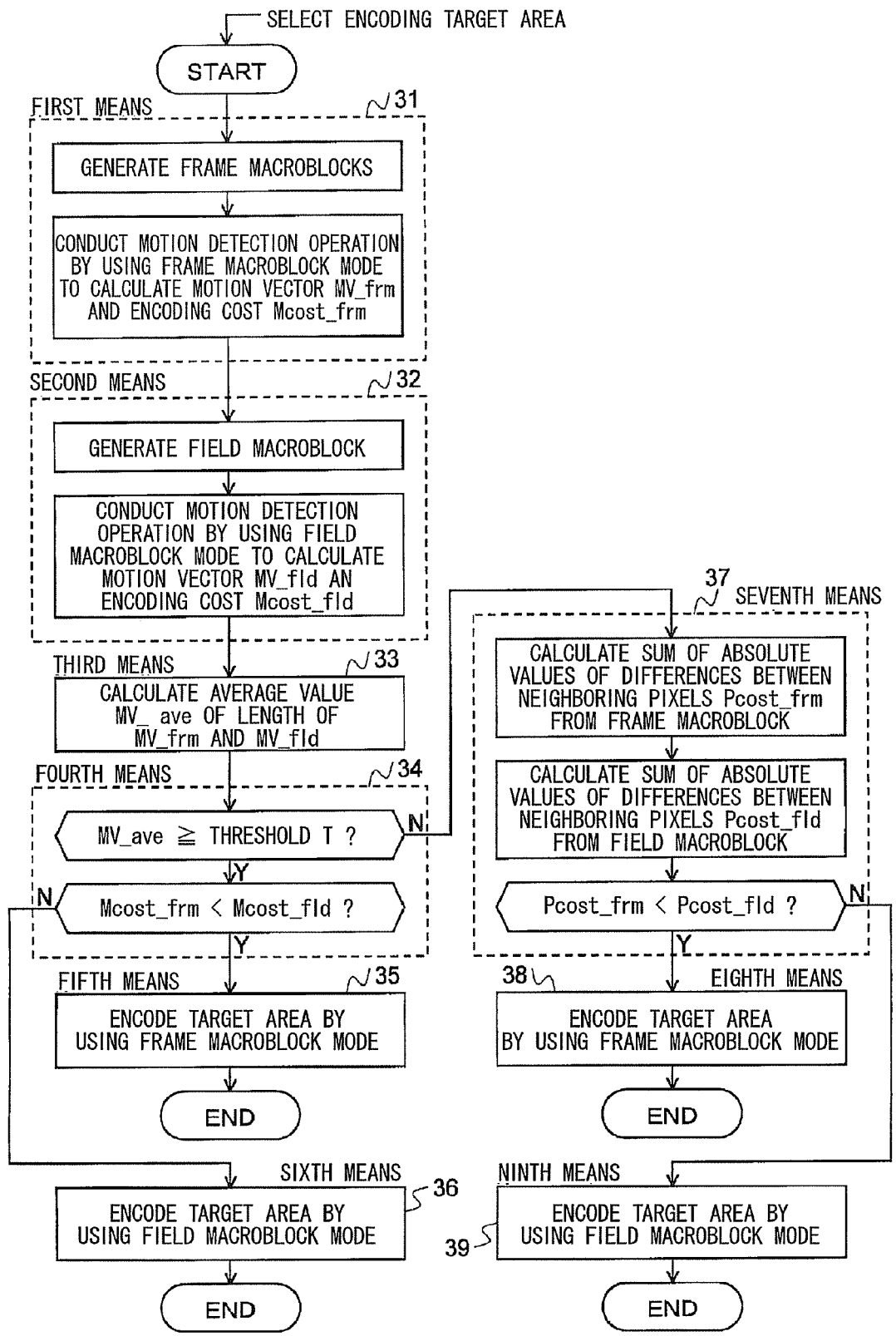
FIG. 6 is a flowchart showing an operation of a third embodiment.

FIG. 6 is a flowchart of a video encoding method using a frame macroblock mode/field macroblock mode determination method of a third embodiment.

"31" of the drawings shows a first means which conducts a motion detection operation on frame macroblocks extracted from the input image which is an encoding target, and by conducting such calculation, a motion vector which is MV_frm and an encoding cost which is Mcost_frm are calculated. "32" of the drawings shows a second means which conducts a motion detection operation on field macroblocks extracted from the input image which is an encoding target, and by conducting such a calculation, a motion vector which is MV_fld and an encoding cost which is Mcost_fld are calculated. The motion detection operations conducted here detect outlines or profile of motions indicated by the images, and a rough detection is acceptable, for example, integer pixel accuracy.

"33" of the drawings is a third means that calculates an average value (hereinafter, MV_ave) of length of all or a part of motion vectors calculated by the first means 31 and second means 32. It should be noted that it is acceptable to use the minimum value or the maximum value in place to the average value as an evaluation value of a size of motion vectors.

"34" of the drawings shows a fourth means which compares the MV_ave calculated by the third means 33 to a threshold T. The threshold T is a parameter used for determining whether the target area is a still area or a moving area and is set in accordance with an indication of 1 pixel per 1/30 second. However, such a setting of the threshold is one simple indication, and it is possible to adjust it if necessary. When MV_ave is larger than the threshold T, it is determined that the target area is a moving area, the encoding costs Mcost_frm and Mcost_fld that are calculated by the first means 31 and second means 32 are compared, and a macroblock mode of comparatively small cost is determined.

"35" of the drawings shows a fifth means which encodes the target area by using the frame macroblock mode if the fourth means 34 determines that Mcost_frm is comparatively small. "36" of the drawings shows a sixth means which encodes the target area by using the field macroblock mode if the fourth means 34 determines that Mcost_fld is comparatively small.

"37" of the drawings shows a seventh means which, if the fourth means 34 determines that MV_ave is not larger than the threshold T, that is, if it is determined that the target area is a still area, regarding the frame macroblock and field macroblock, calculates sum of absolute values of differences between neighboring pixels in a vertical direction (hereinafter, respectively called Pcost_frm and Pcost_fld) and compares them.

"38" of the drawings shows an eighth means which encodes the target area by using the frame macroblock mode if the seventh means 37 determines that Pcost_frm is comparatively small. "39" of the drawings shows a ninth means which encodes the target area by using the field macroblock mode if the seventh means 37 determines that Pcost_fld is comparatively small.

Figure 7:
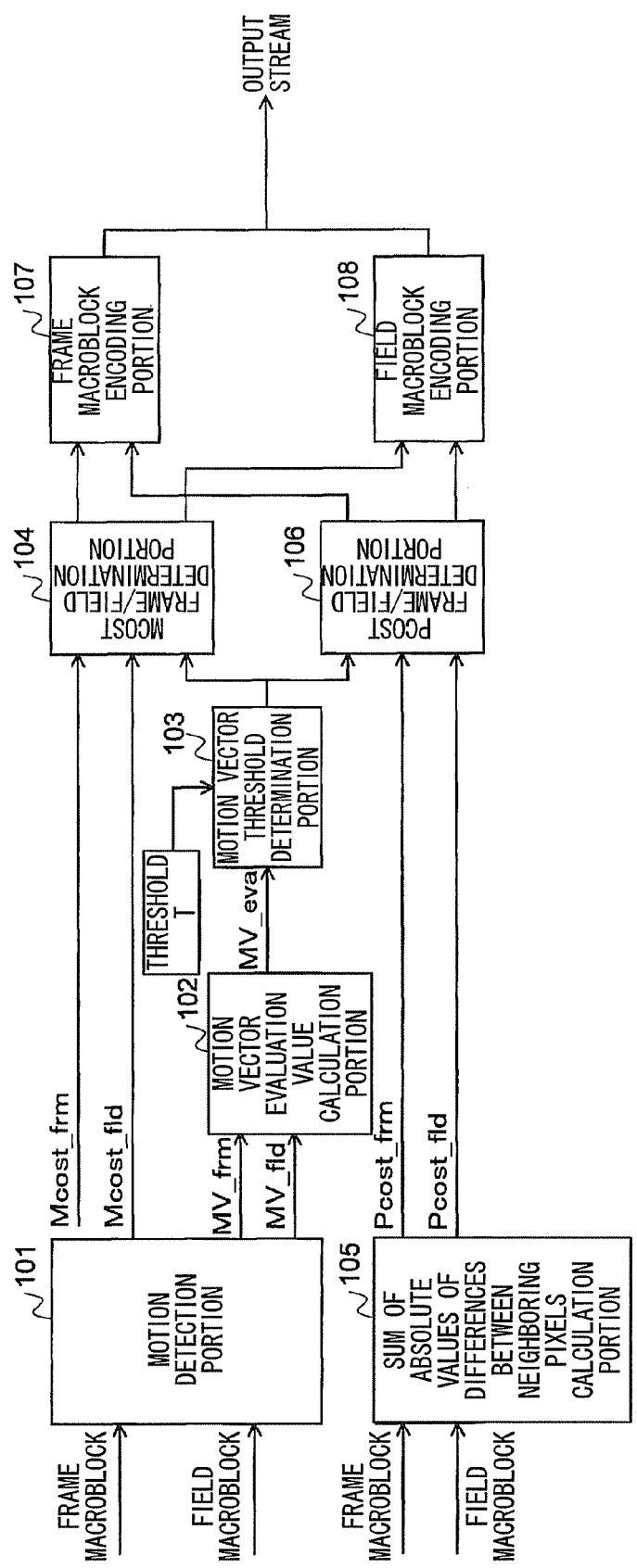
FIG. 7 is a drawing showing an example of a constitution of a video encoding apparatus regarding one embodiment.

FIG. 7 is a drawing showing an example of a constitution of a video encoding apparatus of the present invention.

In FIG. 7, a motion detection portion 101 corresponds to the first means 11, 21 and 31 and second means 12, 22 and 32 of FIGS. 4-6. A vector evaluation value calculation portion 102 corresponds to the third means 13, 23 and 33. A motion vector threshold determination portion 103 and Mcost frame/field determination portion 104 correspond to the fourth means 14, 24 and 34. A sum of absolute values of differences between a neighboring pixels calculation portion 105 and a Pcost frame/field determination portion 106 corresponds to the seventh means 17, 27 and 37. A frame macroblock encoding portion 107 corresponds to the fifth means 15, 25 and 35 and eighth means 18, 28 and 38. A field macroblock encoding portion 108 corresponds to the sixth means 16, 26 and 36 and ninth means 19, 29 and 39.

The motion detection portion 101 conducts a motion detection operation on frame macroblocks and field macroblocks, calculated motion vectors are MV_frm and MV_fld, and encoding costs are Mcost_frm and Mcost_fld. The motion detection operations conducted here detect outlines or profile of motions included in the image, and a rough detection is acceptable, for example, integer pixel accuracy.

The motion vector evaluation value calculation portion 102 calculates an evaluation value MV_eva of the size of all or a part of motion vectors calculated by the motion detection portion 101. It should be noted that in the first embodiment, the maximum value MV_max of absolute values of horizontal/vertical components of motion vectors is calculated as the evaluation value MV_eva. In the second embodiment, the minimum value MV_min of Manhattan distance of motion vectors is calculated as the evaluation value MV_eva. In the third embodiment, the average value MV_ave of the length of motion vectors is calculated as the evaluation value MV_eva.

The motion vector threshold determination portion 103 compares the MV_eva calculated by the motion vector evaluation value calculation portion 102 to a predetermined threshold T to determine whether the target area is a still area or a moving area. The motion vector threshold determination portion 103 notifies the comparison result to the Mcost frame/field determination portion 104 and Pcost frame/field determination portion 106.

If it is determined that MV_eva is larger than the threshold T, that is, if it is determined that the target area is a moving area, the Mcost frame/field determination portion 104 compares the encoding costs Mcost_frm and Mcost_fld that are calculated by the motion detection portion 101. If Mcost_frm is comparatively small, the Mcost frame/field determination portion 104 determines that the frame macroblock mode is to be used and outputs a command to the frame macroblock encoding portion 107 to encode the target area using the frame macroblock mode. The frame macroblock encoding portion 107 encodes the target area using the frame macroblock mode and outputs an encoded stream thereof.

If Mcost_fld is comparatively small, the Mcost frame/field determination portion 104 determines the field macroblock mode is to be used and outputs a command to the field macroblock encoding portion 108 to encode the target area using the field macroblock mode. The field macroblock encoding portion 108 encodes the target area by using the field macroblock mode and outputs an encoded stream thereof.

On the other hand, the sum of absolute values of differences between neighboring pixels calculation portion 105 calculates both the sum of absolute values of differences between neighboring pixels in a vertical direction Pcost_frm regarding the frame macroblock and the sum of absolute values of differences between neighboring pixels in a vertical direction Pcost_fld regarding the field macroblock.

If the motion vector threshold determination portion 103 determines that MV_eva is not larger than the threshold T, that is, if the motion vector threshold determination portion 103 determines that the target area is a still area, the Pcost frame/field determination portion 106 compares Pcost_frm and Pcost_fld. If Pcost_frm is comparatively small, the Pcost frame/field determination portion 106 determines the frame macroblock mode is to be used and outputs a command to the frame macroblock encoding portion 107 to encode the target area using the frame macroblock mode. The frame macroblock encoding portion 107 encodes the target area by using the frame macroblock mode and outputs an encoded stream thereof. If Pcost_fld is comparatively small, the Pcost frame/field determination portion 106 determines the field macroblock mode to be used and outputs a command to the field macroblock encoding portion 108 to encode the target area using the field macroblock mode. The field macroblock encoding portion 108 encodes the target area using the field macroblock mode and outputs an encoded stream thereof.

The motion detection portion 101 conducts a motion detection operation on frame macroblocks and field macroblocks to calculate motion vectors and calculates both frame detection cost Mcost_frm and field detection cost Mcost_fld as encoding costs. It should be noted that, for example, as such a detection cost, it is acceptable to calculate the sum of two values below.

The sum of absolute values or square of differences of pixel values between one block and a reference block pointed to by the motion vector.

A cost value corresponding to a difference between a motion vector of one block and a predicted vector calculated based on encoded motion vectors around the block.

Figure 8:
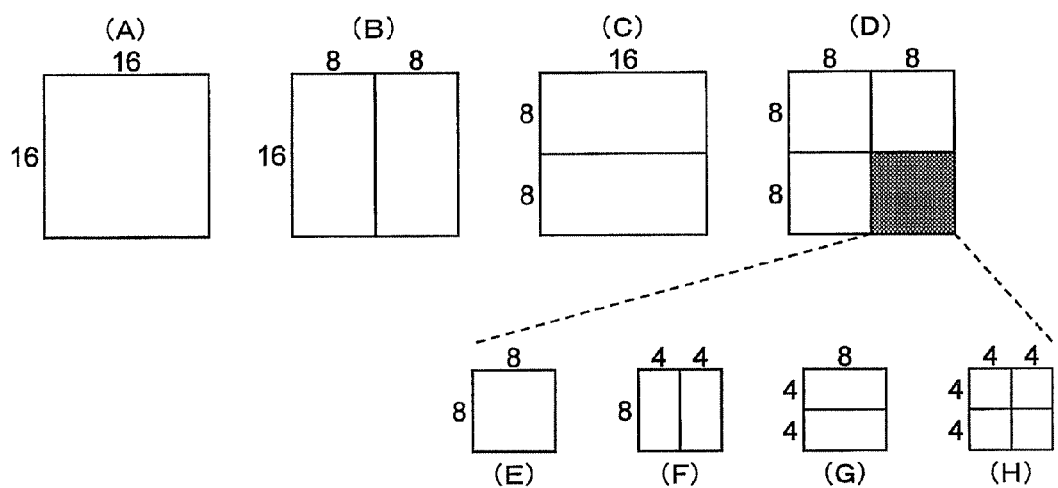
FIG. 8 is a drawing showing an example of a block division.

FIG. 8 shows an example of block division used upon conducting a motion detection by the motion detection portion 101. The motion detection portion 101 divides a macroblock of 16×16 pixels into blocks shown in FIG. 8 and conducts a motion detection regarding each block. Regarding a macroblock of 16×16 pixels as shown in FIG. 8(A), it is possible to apply a division in a vertical direction into two blocks of 8×16 as shown in FIG. 8(B), a division in a horizontal direction into two blocks of 16×8 as shown in FIG. 8(C) and a division into four blocks of 8×8 as shown in FIG. 8(D), and in addition, regarding a block of 8×8, it is possible to choose a division from four types including 8×8, 4×8, 8×4 and 4×4 as shown in FIG. 8(E)-(H). A case in which a number of motion vectors per one macroblock is the maximum is a case in which the blocks of 4×4 are chosen for all blocks, and in such a case, the number of motion vectors is 16.

In the motion vector evaluation value calculation portion 102, it is possible to use following methods as a calculation method of an evaluation value of size of motion vectors.

(1) Determining evaluation values by calculating the maximum value, the minimum value or average value between absolute values regarding each of horizontal and vertical components of motion vectors.

(2) Determining evaluation values by calculating the maximum value, minimum value or average value between Manhattan distances of motion vectors.

$$\text{Manhattan distance} = (\text{absolute value of horizontal component}) + (\text{absolute value of vertical component})$$

(3) Determining evaluation values by calculating the maximum value, minimum value or average value between the lengths or square of lengths of motion vectors.

$$\text{Square of length of motion vector} = (\text{horizontal component})^2 + (\text{vertical component})^2$$

Figure 9:
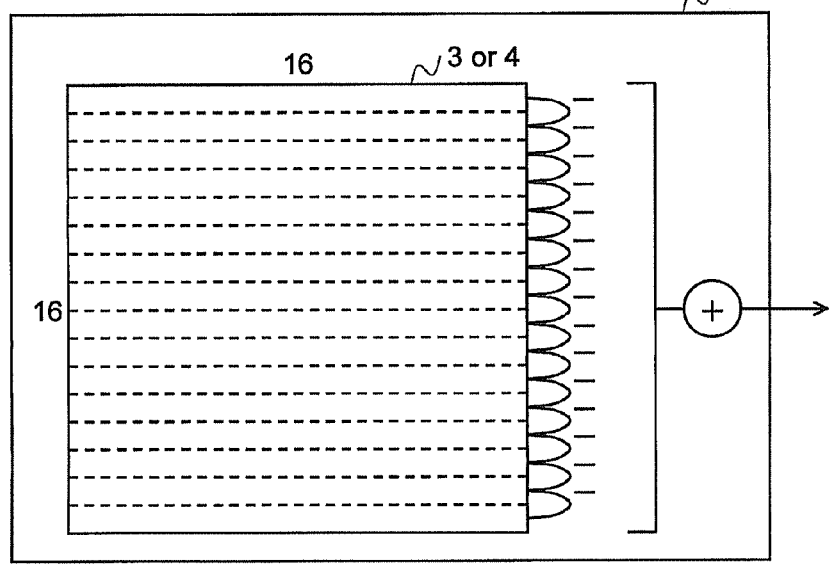
FIG. 9 is an explanation drawing showing a sum of absolute values of differences between neighboring pixels used in one embodiment.

FIG. 9 is an explanation drawing showing a sum of absolute values of differences between pixels neighboring in vertical direction that is calculated by the sum of absolute values of differences between neighboring pixels calculation portion 105.

Regarding each of the frame macroblock 3 explained in FIG. 2 and the field macroblock 4 explained in FIG. 3, in a manner shown in Formula (1), the sum of absolute values of differences between neighboring pixels calculation portion 105 calculates a sum of absolute values of differences between pixels neighboring in vertical direction (hereinafter, S_frm0, S_frm1, S_fld0 and S_fld1). Here, ABS(a) is an absolute value of "a", $i_{m,n}$ is (m, n) component (m=1, ..., 16, n=1, ..., 16).

[Formula 1]

$$S\_frm0, S\_frm1, S\_fld0, S\_fld1 = \sum_{m=1}^{16}\sum_{n=1}^{15} \text{ABS}(i_{m,n} - i_{m,n+1}) \quad (1)$$

After this, as shown in Formulas (2) and (3), regarding each macroblock, a sum of absolute values of differences (hereinafter, Pcost_frm and Pcost_fld) is calculated and sent to the Pcost frame/field determination portion 106. The Pcost frame/field determination portion 106 compares these two values each other and determines whether the frame macroblock mode or field macroblock mode is used.

$$P\text{cost\_frm} = S\_frm0 + S\_frm1 \quad (2)$$

$$P\text{cost\_fld} = S\_fld0 + S\_fld1 \quad (3)$$

The above-described video encoding methods can be implemented by using hardware or firmware, it is possible to implement by using a computer and a software program, and it is possible to supply the software program by using a computer readable recording medium storing it or by using a network.

It should be noted that in the above-described embodiments, the encoding target area 2 is explained as a rectangular area of M×2M (M=16) in a portrait form, however, the encoding target area 2 is not limited to this. For example, it can be a rectangular area in a landscape form.

Preferable embodiments of the present invention are explained above, however, the present invention is not limited to such embodiments. It is possible to apply addition, omission and replacement of constitutional elements and other changes if such changes do not go beyond a scope of the present invention. The present invention is not limited by the above-described explanation and is limited only by the attached claims.

INDUSTRIAL APPLICABILITY

The present invention relates to a video encoding operation and can reduce operation load upon executing software and downsize hardware.

The invention claimed is:

1. A video encoding method which compresses video data by dividing the video data including frames constituted from a pair of fields into macroblocks of a predetermined size and which outputs a bit stream, comprising:
a first step of dividing a rectangle including M pixels along a horizontal direction and 2M pixels along a vertical direction into a pair of rectangles including M pixels along a horizontal direction and M pixels along a vertical direction, conducting a motion detection regarding each of said pair of rectangles and calculating both motion vectors and a frame detection cost which is an encoding cost upon using the motion vector;
a second step of dividing the rectangle including M pixels along a horizontal direction and 2M pixels along a vertical direction into a rectangle including M pixels along a horizontal direction and M pixels constituted from odd lines along a vertical direction and a rectangle including M pixels along a horizontal direction and M pixels constituted from even lines along a vertical direction, conducting a motion detection regarding each of a pair of rectangles and calculating both motion vectors and a field detection cost which is an encoding cost upon using the motion vector;
a third step of calculating an evaluation value of size of motion vectors determined as a result of motion detection of both the first step and second step;
a fourth step of, if the evaluation value of size of the motion vectors calculated in the third step is larger than a predetermined threshold, comparing the frame detection cost of the first step to the field detection cost of the second step and choosing comparatively small cost;
a fifth step of, if the frame detection cost is chosen at the fourth step, conducting encoding on the encoding target area using frame macroblock mode;
a sixth step of, if the field detection cost is chosen at the fourth step, conducting encoding on the encoding target area using field macroblock mode;
a seventh step of, if the evaluation value of size of the motion vector calculated at the third step is smaller than the predetermined threshold, calculating a sum of absolute values of differences between neighboring pixels in a vertical direction regarding the frame macro blocks using frame pixel cost, calculating a sum of absolute values of differences between neighboring pixels in a vertical direction regarding the field macro blocks using field pixel cost and choosing comparatively small pixel cost;
an eighth step of, if the frame pixel cost is chosen at the seventh step, conducting encoding on the encoding target area using frame macroblock mode;
a ninth step of, if the field pixel cost is chosen at the seventh step, conducting encoding on the encoding target area using field macroblock mode.

2. The movie encoding method according to claim 1, wherein
the evaluation value of size of the motion vector is a maximum, minimum or average value of absolute values of horizontal and vertical components of motion vectors that are calculated regarding each of the frame macroblocks, field macroblocks or divided blocks of these macroblocks.

3. The movie encoding method according to claim 1, wherein
the evaluation value of size of the motion vector is maximum, minimum or average value of Manhattan distance of motion vectors that are calculated regarding each of the frame macroblocks, field macroblocks or divided blocks of these macroblocks.

4. The movie encoding method according to claim 1, wherein
the evaluation value of a size of the motion vector is a maximum, minimum or average value of a length of motion vectors that are calculated for each of the frame macroblocks, field macroblocks or divided blocks of these macroblocks.

5. A movie encoding computer program stored in a non-transitory computer readable medium of a computer for executing the movie encoding method according to claim 1 on a computer.

6. A video encoding apparatus which compresses and outputs video data including a frame constituted from at least two encoding target areas, the video encoding apparatus comprising:
a computer;
a non-transitory computer readable medium storing instructions which when operated upon by the computer causes the computer to operate as a detection unit which calculates both a first motion vector and a frame detection cost as an encoding cost based on frame macroblocks generated by dividing the encoding target area and which calculates both a second motion vector and a field detection cost as an encoding cost based on field macroblocks generated by dividing the encoding target area;

a non-transitory computer readable medium storing instructions which when operated upon by the computer causes the computer to operate as a motion vector determination unit which, based on the first and second motion vectors, determines whether the encoding target area is a moving area or still area, wherein the motion vector determination unit comprises: a motion vector evaluation value calculation portion calculating an evaluation value of a size of the first and second motion vectors; and a threshold determination portion which determines the encoding target area as a moving area by determining if the evaluation value of size of the first and second motion vectors is larger than a predetermined threshold, where if the first and second motion vectors are larger than a predetermined threshold then comparing the frame detection cost to the field detection cost and choosing comparatively smaller cost;

a non-transitory computer readable medium storing instructions which when operated upon by the computer causes the computer to operate as a first frame/field determination unit, when the encoding target area is a still area, which encodes the encoding target area by using a frame macroblock mode if the frame detection cost is smaller than the field detection cost, and which encodes the encoding target area by using a field macroblock mode if a reverse situation;

a non-transitory computer readable medium storing instructions which when operated upon by the computer causes the computer to operate as a frame/field pixel cost calculation unit which, if the encoding target area is a still area, calculates both a frame pixel cost of the frame macroblock and a field pixel cost of the field macroblock; and a non-transitory computer readable medium storing instructions which when operated upon by the computer causes the computer to operate as a second frame/field determination unit which encodes the encoding target area by using a frame macroblock mode if the frame pixel cost is smaller than the field pixel cost, and which encodes the encoding target area using a field macroblock mode if a reverse situation.

7. A video encoding apparatus according to claim 6, wherein
the threshold determination portion determines the encoding target area as a moving area if the evaluation value of size of the first and second motion vectors is larger than the predetermined threshold, and which determines the encoding target area as a still area if the evaluation value of size of the first and second motion vectors is smaller than the predetermined threshold.

8. A video encoding apparatus according to claim 6, wherein
the frame/field pixel cost calculation unit calculates the frame pixel cost based on a sum of absolute values of differences between neighboring pixels in a vertical direction regarding the frame macro blocks and calculates the field pixel cost based on a sum of absolute values of differences between neighboring pixels in a vertical direction regarding the field macro blocks.

9. A video encoding apparatus according to claim 7, wherein
the motion vector evaluation value calculation unit calculates the evaluation value of size of the motion vector as maximum, minimum or average value of absolute values of horizontal and vertical components of motion vectors which are calculated regarding each of the frame macroblocks, field macroblocks or divided blocks of these macroblocks.

10. A video encoding apparatus according to claim 7, wherein
the motion vector evaluation value calculation unit calculates the evaluation value of size of the motion vector as maximum, minimum or average value of Manhattan distance of motion vectors which are calculated regarding each of the frame macroblocks, field macroblocks or divided blocks of these macroblocks.

11. A video encoding apparatus according to claim 7, wherein
the motion vector evaluation value calculation unit calculates the evaluation value of size of the motion vector as maximum, minimum or average value of length of motion vectors that are calculated regarding each of the frame macroblocks, field macroblocks or divided blocks of these macroblocks.

\* \* \* \* \*